· US007558400B1

United States Patent
Toksvig et al.

(10) Patent No.: US 7,558,400 B1
(45) Date of Patent: Jul. 7, 2009

(54) ANISOTROPIC TEXTURE FILTERING OPTIMIZATION

(75) Inventors: Michael J. M. Toksvig, Palo Alto, CA (US); William P. Newhall, Jr., San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 656 days.

(21) Appl. No.: 11/299,176

(22) Filed: Dec. 8, 2005

(51) Int. Cl.
*G06K 9/00* (2006.01)
*G09G 5/00* (2006.01)

(52) U.S. Cl. .................... 382/100; 382/260; 345/586

(58) Field of Classification Search ............... 382/100, 382/106, 108, 176, 181, 203, 260, 274, 303, 382/305, 254, 276, 312; 359/326; 345/582, 345/586, 428, 581
See application file for complete search history.

(56) References Cited

U.S. PATENT DOCUMENTS

| | | | | |
|---|---|---|---|---|
| 5,528,003 A * | 6/1996 | Bodin et al. | ............ | 172/18 |
| 6,040,837 A * | 3/2000 | Wong et al. | ............ | 345/586 |
| 6,104,415 A | 8/2000 | Gossett | | |
| 6,252,698 B1 * | 6/2001 | Oikawa | ............ | 359/326 |
| 6,292,193 B1 * | 9/2001 | Perry et al. | ............ | 345/582 |
| 6,525,740 B1 * | 2/2003 | Cosman | ............ | 345/584 |
| 6,664,971 B1 * | 12/2003 | Mukherjee et al. | ............ | 345/582 |
| 6,707,458 B1 | 3/2004 | Leather et al. | | |
| 6,724,395 B1 | 4/2004 | Treichler | | |
| 6,850,243 B1 * | 2/2005 | Kilgariff et al. | ............ | 345/582 |
| 6,919,904 B1 * | 7/2005 | Kilgariff | ............ | 345/582 |
| 6,947,054 B2 | 9/2005 | Spangler | | |
| 7,221,371 B2 | 5/2007 | Donovan et al. | | |
| 7,271,810 B1 | 9/2007 | Newhall et al. | | |
| 7,339,594 B1 | 3/2008 | Newhall et al. | | |
| 2002/0126133 A1 | 9/2002 | Ewins | | |
| 2005/0219256 A1 | 10/2005 | Donovan et al. | | |

OTHER PUBLICATIONS

Zwicker, et al. "EWA Splatting," IEEE Transactions on Visualization and Computer Graphics, IEEE Service Center, Jul. 2002. vol. 8(3): pp. 1-15.
Chen, et al. "Footprint Area Sampled Texturing," IEEE Transactions on Visualization and Computer Graphics, Mar./Apr. 2004 vol. 10(2): pp. 230-240.

(Continued)

*Primary Examiner*—Seyed Azarian
(74) *Attorney, Agent, or Firm*—Patterson & Sheridan, LLP

(57) ABSTRACT

A method for optimizing the number of bilinear samples includes the steps of computing a desired bilerp count for a pixel footprint in a mipmap, where a fractional distance represents the distance between the desired bilerp count and a first available bilerp count relative to the distance between a second available bilerp count and the first available bilerp count, determining a modified bilerp count based on the desired bilerp count, and computing a modified fractional distance based on the modified bilerp count, where the modified fractional distance is zero if the fractional distance is between zero and a first-non-zero value, but is between zero and one if the fractional distance is within a transition band. Texture values for the bilerps in the first available count and one or more additional bilerps are average to generate a pixel texture value, where the modified fractional distance determines the weights applied.

20 Claims, 7 Drawing Sheets

OTHER PUBLICATIONS

Baoquan Chen et al., "Footprint Area Sampled Texturing", IEEE Transactions on Visualization and Computer Graphics, vol. 10 No. 2, Mar./Apr. 2004, pp. 230-240.

Ritter, Jack, "A Fast Approximation To 3D Euclidian Distance," *Graphics Gems*, edited by Andrew S. Glassner, pp. 432-433, Academic Press, Inc. 1990.

Ohashi, Yoshikazu, "Fast Linear Approximations of Euclidian Distance in Higher Dimensions," *Graphics Gems IV*, edited by Paul S. Heckbert, pp. 120-124, Academic Press, Inc. 1994.

Barkans, Anthony C., "High Quality Rendering Using the Talisman Architecture," SIGGRAPH/Eurographics Workshop, 1997.

"Anisotropic Texture Filtering," Meltdown Feb./1998 Prerelease, Direct3D Reference Rasterizer, (1998).

Talisman 3D Technology Briefing, Talisman Graphics & Multimedia System, (1997).

McCormack, Joe, et al., "Feline: Fast Elliptical Lines for Anisotropic Texture Mapping," Mitsubishi Electric Information Technology Center America, 2000.

Greene, Ned, et al., "Creating Raster Omnimax Images from Multiple Perspective Views Using the Elliptical Weighted Average Filter," IEEE Computer Graphics and Applications, vol. 6, Issue 6, pp. 21-27, Jun. 1986.

Williams, Lance, "Pyramidal Parametrics," Computer Graphics, vol. 17, No. 3, Jul. 1983.

Heckbert, Paul S., "Fundamentals of Texture Mapping and Image Warping," *Master's Thesis*, Dept. of Electrical Engineering and Computer Science, University of California, Berkeley, CA, Jun. 17, 1989.

"ATI's Optimized Texture Filtering Called Into Question," Tom's Hardware Guide, Dec. 17, 2004. <http://www20.graphics.tomshardware.com/graphic/20040603/index.html>.

Heckbert, Paul, "Texture Mapping Polygons In Perspective," Computer Graphics Lab, New York Institute of Technology, Technical Memo No. 13, Apr. 28, 1983.

* cited by examiner

ANISOTROPIC TEXTURE FILTERING OPTIMIZATION

BACKGROUND OF THE INVENTION

1. Field of the Invention

Embodiments of the present invention relate generally to computer graphics and more specifically to anisotropic optimization for texture filtering.

2. Description of the Related Art

Conventional graphics processors read and filter texture maps to add texture detail and increased realism to rendered objects. This process, commonly referred to as "texture filtering," may be simplified by pre-filtering a given texture map to various resolution levels, where each pre-filtered resolution level forms a "mipmap." The resolution level associated with a given mipmap is commonly referred to as a "level of detail" (LOD).

When texturing a pixel, the pixel is first mapped from screen space to texture space. In a case where mipmaps are used, the pixel is mapped to the appropriate mipmap. The region in texture space corresponding to a pixel is commonly called the pixel footprint. While a pixel is usually approximated by a circle in screen space, the corresponding footprint in texture space is oftentimes approximated by an ellipse, especially in view of texture stretching, oblique viewing and perspective. An example of an elliptical pixel footprint 115 within a mipmap 101 is shown in FIG. 1. In order to compute a texture value for the pixel, the values of the individual texels (i.e., texture pixels) and partial texels encompassed by the pixel footprint 115 need to be blended together. Anisotropic texture filtering is a technique for computing the texture value of a pixel having an elliptical footprint that attempts to match the shape of the elliptical footprint to achieve an accurate blending of the texels encompassed by the footprint.

As is well-known, the shape of the corresponding elliptical footprint may be approximated by two or more bilinear samples (also referred to as "bilerps"). Each bilerp has a circular footprint, and four texels usually form a 2×2 square about the center of the circular footprint. The texture value of a bilinear sample is equal to the interpolated values of these four texels, where a typical bilinear filter is used for the interpolation. The optimal number of bilerps used to approximate an elliptical pixel footprint (the "desired" bilerp count) may be determined in a variety of different ways known in the art. For example, the desired bilerp count may be set equal to the anisotropic ratio ((major-axis length)/(minor-axis length)) associated with the elliptical pixel footprint or, for course level mipmaps, may be set equal to the major-axis length.

In a graphics processing system, there are usually operational points that include discrete available bilerp counts. For example, in one graphics processing system, the available bilerp counts may be two, four, six and eight bilerps, but in another system, the available bilerp counts may be two, four, eight and sixteen bilerps. Generally, to calculate the texture value of a pixel having an elliptical footprint, the texture value corresponding to each bilerp used to approximate the pixel footprint is first computed, and then a weighted average of the texture values for all of the bilerps is computed. In cases where the desired bilerp count is equal to an available bilerp count, the texture value for each bilerp is given an equal weight. For example, if the desired bilerp count is two and two bilerps is one of the available bilerp counts, the texture value for each of the two bilerps is weighted by 0.5 and added together.

However, if the desired bilerp count is not coincident with an available bilerp count, then the desired bilerp count will fall between two available bilerp counts (hereinafter referred to as the "first available count" and the "second available count"). In such cases, the texture value for the pixel footprint is computed based on the number of bilerps associated with the second available count, where a first weight is given to the texture value for each bilerp in the first available bilerp count and a second weight is given to the texture value for each "additional" bilerp (the first available bilerp count plus the additional bilerps equals the second available bilerp count). The first and second weights are based on the distance between the desired bilerp count and the first available bilerp count relative to the total distance between the second available bilerp count and the first available bilerp count. In other words, the weights are based on what "fraction" of the total distance between the first and second available bilerp counts the distance between the desired bilerp count and the first available bilerp count represents (hereinafter referred to as the "fractional distance").

In instances where the desired bilerp count $(C_D)$ falls between the first available bilerp count $(C_i)$ and the second available bilerp count $(C_{i+1})$, the fractional distance (f) is given by the equation:

$$f=(C_D-C_i)/(C_{i+1}-C_i), \quad (1)$$

and a weighting factor (x) is defined by the equation:

$$x=1/(C_i+(f)(C_{i+1}-C_i)). \quad (2)$$

The texture value for the pixel footprint is computed using the number of bilerps in the second available bilerp count $(C_{i+1})$. Specifically, the texture value for each of the bilerps in the first available bilerp count $(C_i)$ is multiplied by a first weight, x, and the texture value for each of the additional bilerps $(C_{i+1}-C_i)$ is multiplied by a second weight, (f*x). These products are then added together to produce the texture value for the pixel footprint. As persons skilled in the art will recognize, the additional bilerps are effectively "phased in" as the fractional distance approaches 1.0 and the desired bilerp count approaches the second available bilerp count. When the desired bilerp count is coincident with the second available bilerp count, the texture value for each bilerp in the second available bilerp count is given an equal weight.

FIG. 2 illustrates a graph of a function 205 setting forth the relationship between the desired bilerp count $(C_D)$ and the bilerp count used to calculate a texture value for a pixel $(C_C)$, according to the prior art. As shown, both axes of the graph include the bilerp counts available within a particular graphics system $(C_1, C_2, C_3$ and $C_4)$. The desired bilerp count $(C_D)$ has an associated fractional distance (f), both of which are shown on the x-axis of the graph. The bilerp count used to compute the pixel texture value $(C_C)$ and its associated fractional distance (f) are shown on the y-axis of the graph. Importantly, the function 205 is a forty-five degree line, making the fractional distance (f) associated with the desired bilerp count $(C_D)$ identical to the fractional distance (f) associated with the bilerp count used to calculate the pixel texture value $(C_C)$ and creating a one-to-one relationship between the desired bilerp count $(C_D)$ and the count used to calculate the pixel texture value $(C_C)$. Thus, when the desired bilerp count $(C_D)$ falls between a first available bilerp count (depicted as $C_2$) and a second available bilerp count (depicted as $C_3$), the fractional distance (f) is computed according to equation (1) above, the weighting factor (x) is computed according to equation (2) above, and the texture value for the pixel is computed as set forth above. In effect, the desired bilerp count $(C_D)$ is used to compute the texture value for the pixel.

To illustrate a typical texture value computation, consider FIG. 3, which shows how six bilerps may be used to compute the texture value for a pixel when the desired bilerp count is 4.1, according to the prior art. Two of the bilerp counts available to the graphics processing system are assumed to be four bilerps and six bilerps. Since four bilerps is the lesser of the two available bilerp counts, four bilerps is designated as the first available bilerp count ($C_i$), and six bilerps is designated as the second available bilerp count ($C_{i+1}$). As shown in the figure, the four bilerps 325 represent the bilerps in the first available bilerp count ($C_i$), and the two bilerps 330 represent the additional bilerps ($C_{i+1}-C_i$) that are included with the four bilerps 325 to make the total number of bilerps equal to six, which is the number of bilerps in the second available bilerp count ($C_{i+1}$). Using the equations (1) and (2) set forth above, the fractional distance (f) is equal to 0.05, and the weighting factor (x) is equal to 0.476. The texture value of the pixel represented by pixel footprint 210 is computed by multiplying the texture value for each bilerp 325 by a first weight of 0.476 (=x), multiplying the texture value for each of the additional bilerps 330 by a second weight of 0.024 (=f*x), and then summing the products.

On drawback of calculating the texture value for the pixel footprint in this manner is that, when the fractional distance (f) is small, the texture values for the additional bilerps are heavily discounted and, therefore, may have relatively little influence on the final texture value. In effect, substantial computational effort may be wasted when the fractional portion (f) is small because the additional bilerps do not contribute much to overall image quality. In other words, when the texture values for the additional bilerps are heavily discounted, the decrease in performance attributable to including the additional bilerps when computing the final texture value may outweigh the marginal increase in overall image quality attributable to the additional bilerps.

As the foregoing illustrates, what is needed in the art is a more efficient approach to anisotropic texture filtering.

SUMMARY OF THE INVENTION

One embodiment of the present invention sets forth a method for determining an optimized number of bilinear samples for computing a texture value for a pixel. The method includes the steps of computing a desired bilerp count for a pixel footprint in a mipmap, where the desired count is between a first available bilerp count and a second available bilerp count, and a fractional distance represents the distance between the desired bilerp count and the first available bilerp count relative to the distance between the second available bilerp count and the first available bilerp count. The method also includes the steps of determining a modified bilerp count based on the desired bilerp count, and computing a modified fractional distance based on the modified bilerp count, where the modified fractional distance is equal to zero if the fractional distance is between zero and a first non-zero value, but is between zero and one if the fractional distance is within a transition band defined between the first non-zero value and a second non-zero value. A pixel texture value may then be computed by taking a weighted average of the texture values for the bilerps in the first available count and for one or more additional bilerps, where the number of additional bilerps equals the difference between the second available bilerp count and the first available bilerp count, and the weights applied are based on the modified fractional distance.

One advantage of the disclosed method is that it optimizes the number of bilinear samples used in an anisotropic texture filter when computing a texture value for a pixel. By recognizing the tradeoff between image quality and performance, the disclosed method uses fewer bilinear interpolations when the corresponding increase in performance outweighs the corresponding decrease in image quality. Conversely, the disclosed method uses more bilinear interpolations when the corresponding increase in image quality outweighs the corresponding decrease in performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
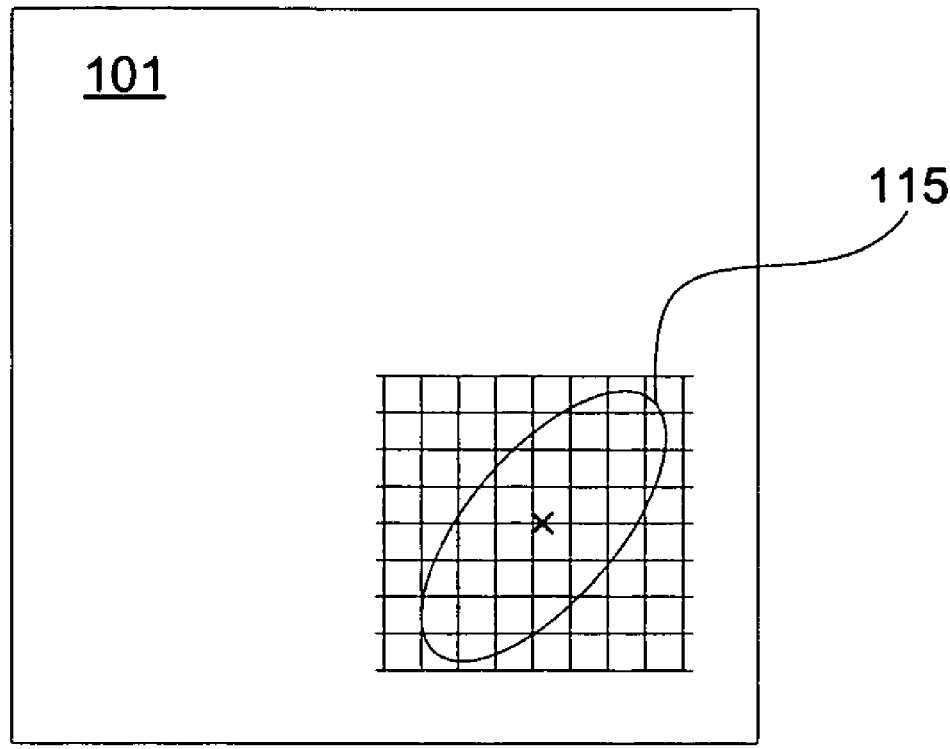
FIG. 1 illustrates an elliptical pixel footprint in texture space, according to the prior art.
Figure 2:
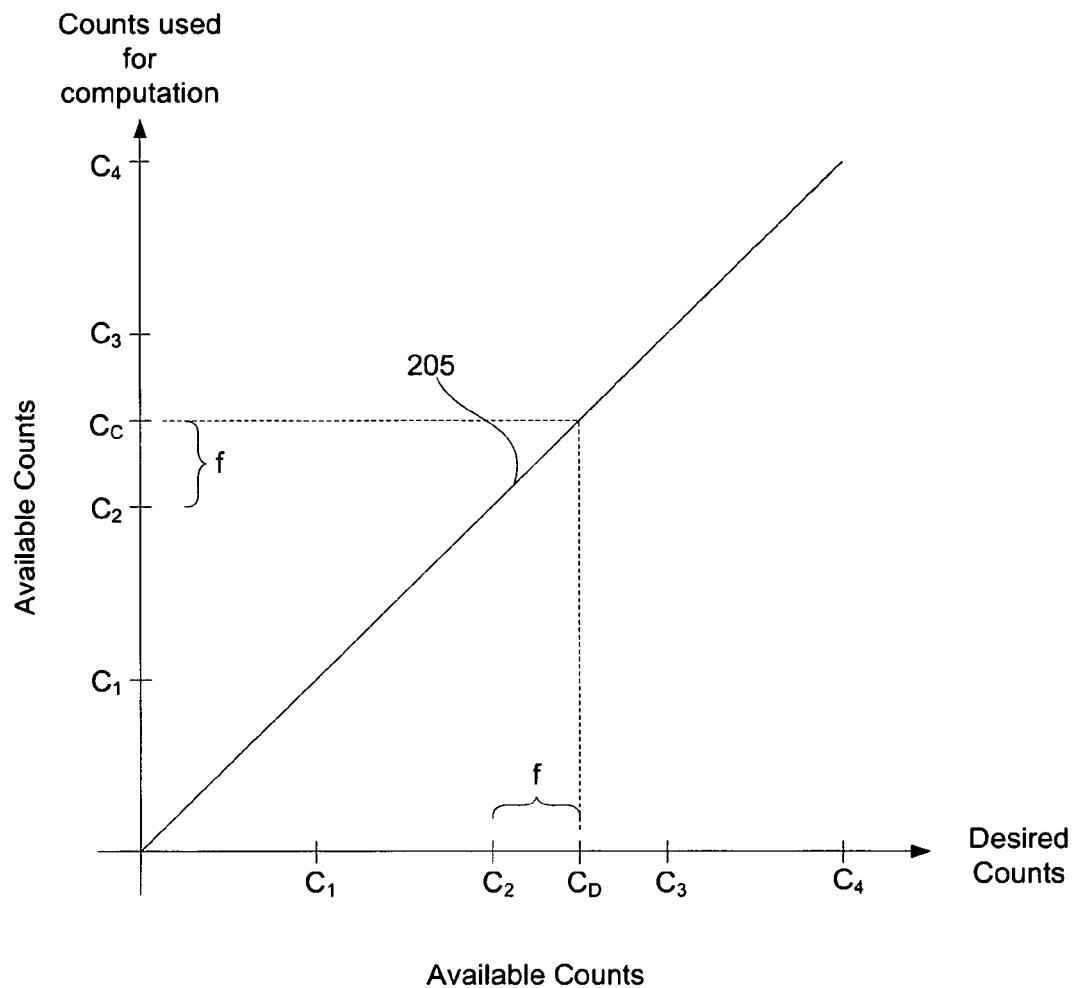
FIG. 2 illustrates a graph of a function setting forth the relationship between the desired bilerp count and the bilerp count used to compute the texture value for a pixel, according to the prior art.
Figure 3:
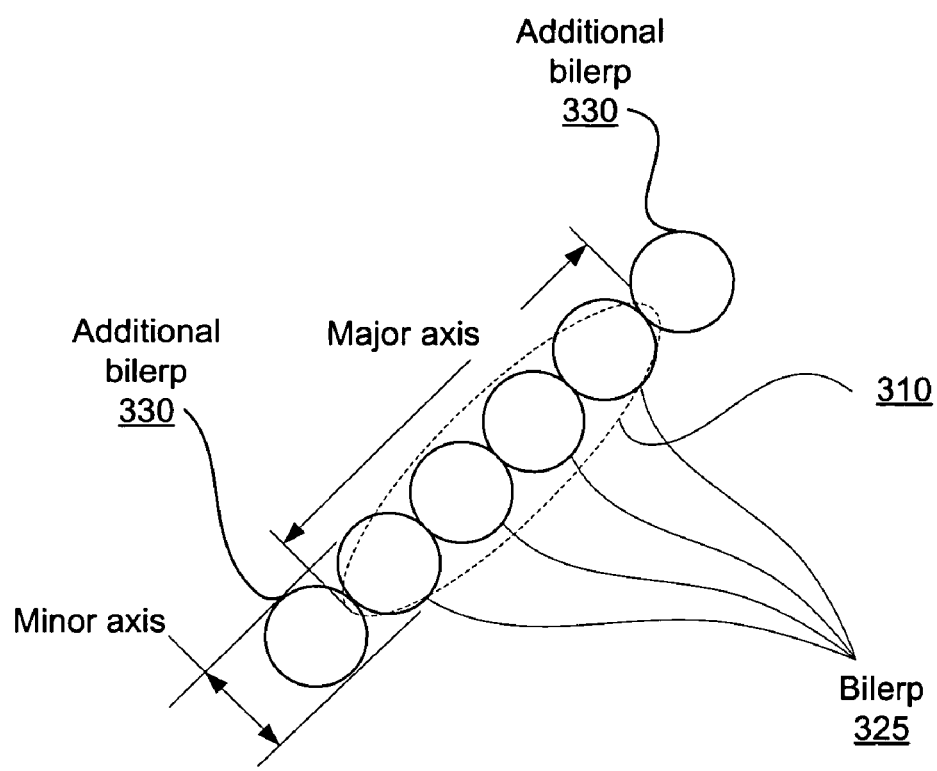
FIG. 3 shows how six bilerps may be used to compute the texture value for a pixel when the desired bilerp count is 4.1, according to the prior art.
Figure 4A:
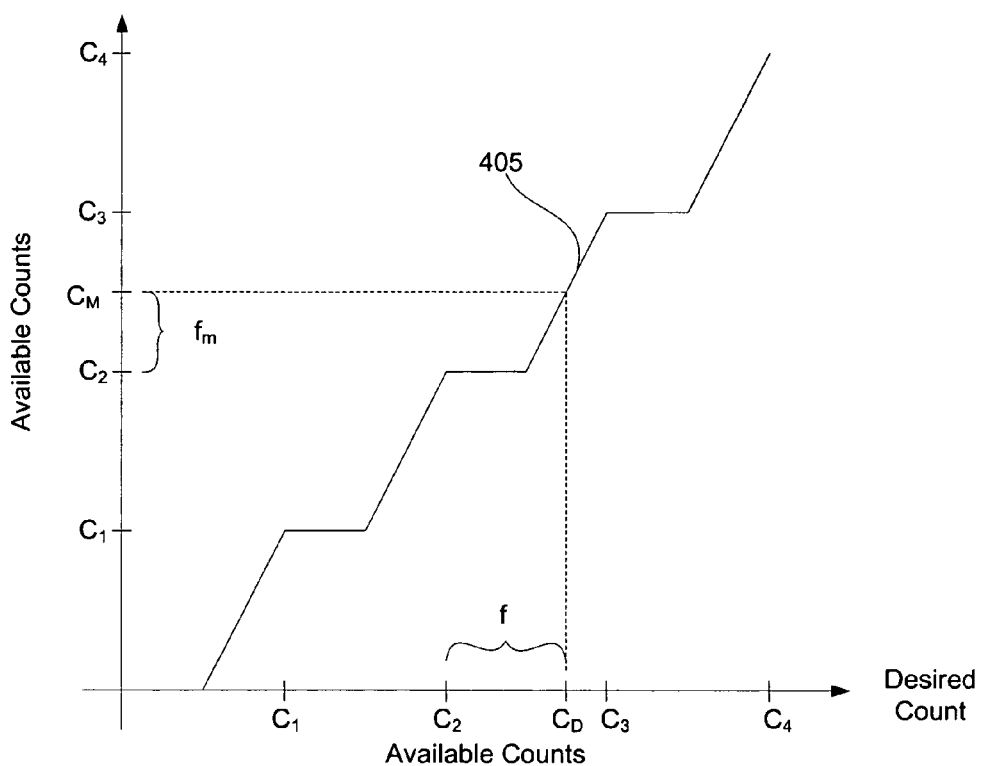
FIGS. 4A-4B illustrate a function for computing a modified bilerp count, according to one embodiment of the present invention.

FIG. 4A illustrates a graph of a function 405 used to compute a modified bilerp count, according to one embodiment of the present invention. Again, both axes of the graph include the bilerp counts available within a particular graphics system ($C_1$, $C_2$, $C_3$ and $C_4$). The desired bilerp count ($C_D$) is shown along the x-axis, and a modified bilerp count ($C_M$) is shown along the y-axis. Function 405 sets forth how the number of bilerps used to compute the texture value for a pixel is optimized by clamping the modified bilerp count to an integer value, corresponding to an available bilerp count, when the desired bilerp count falls within certain ranges. More specifically, the modified fractional distance ($f_m$) associated with the modified bilerp count ($C_M$) is clamped to zero when the fractional distance (f) associated with the desired bilerp count ($C_D$) falls within specific, defined ranges. Once outside each of these ranges, the modified fractional distance ($f_m$) transitions from zero to one, and the modified bilerp count ($C_M$) transitions from the clamped integer value to the next integer value, corresponding to the next available bilerp count. Similar to the fractional distance (f), the modified fractional distance ($f_m$) represents the distance between the modified bilerp count ($C_M$) and an available bilerp count ($C_i$) relative to the distance between the next available bilerp count ($C_{i+1}$) and the available bilerp count ($C_i$).

According to the teachings of the present invention, when a desired bilerp count ($C_D$) falls between a first available bilerp count ($C_i$) and a second available bilerp count ($C_{i+1}$), the texture value for a pixel is computed by multiplying the texture value for each bilerp in the first available bilerp count by a first weight, multiplying the texture value for each additional bilerp ($C_{i+1}-C_i$) by a second weight and then summing together the weighted texture values, as previously describe herein. However, instead of computing the first weight as (x), using equation (2) from above, and then computing the second weight as (f*x), the modified bilerp count ($C_M$) is determined from the desired bilerp count ($C_D$) using the function 405, and then the modified fractional distance ($f_m$) is then determined using the equation:

$$f_m = (C_M - C_i)/(C_{i+1} - C_i). \quad (3)$$

Next, a first weight ($x_1$) is computed using equation (1) from above, but replacing the fractional distance (f) with the modified fractional distance ($f_m$), and a second weight ($x_2$) is computed as ($f_m * x_1$). Thus, the following equations are used for the weights:

$$x_1 = 1/(C_i + (f_m)(C_{i+1} - C_i)), \text{ and} \quad (4)$$

$$x_2 = f_m * x_1. \quad (5)$$

In effect, the modified bilerp count ($C_M$), instead of the desired bilerp count ($C_D$), is used to compute the texture value for the pixel.

As described above and reflected in the foregoing equations, when the modified fractional distance ($f_m$) is clamped to zero, the modified bilerp count ($C_M$) is clamped to an integer value corresponding to an available bilerp count. Therefore, within certain defined fractional distance ranges, the texture value of a pixel is computed using a reduced number of bilerps relative to the prior art approach. In such cases, the texture value for the pixel is computed by multiplying texture value for each bilerp in the available bilerp count to which the modified bilerp count is clamped by the same weight ($x_1$) and summing the weighted texture values. Since the modified fractional distance is equal to zero, the additional bilerps are not used to compute the texture value for the pixel. The defined fractional distance ranges thus represent instances where the texture values for the additional bilerps are heavily discounted and, therefore, have relatively little influence on the final texture value of the pixel. In such instances, the degradation in picture quality resulting from using only bilerps in the bilerp count to which the modified bilerp count ($C_M$) is clamped to compute the pixel texture value is outweighed by the corresponding savings in computational effort resulting from using fewer bilerps in the texture value computation.

Figure 4B:
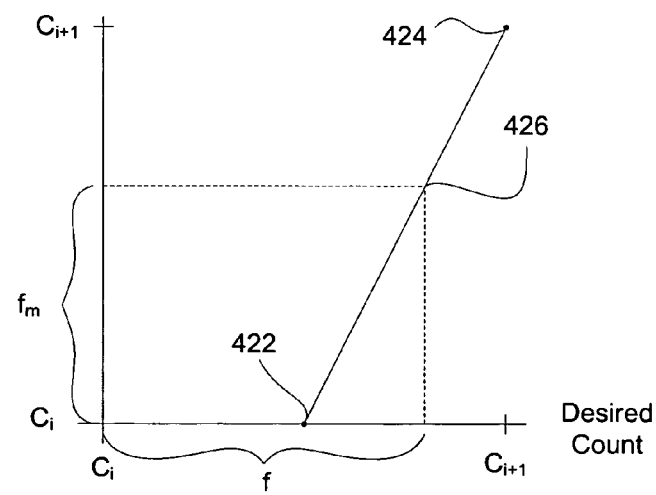

FIG. 4B more specifically illustrates the relationship between the modified fractional distance ($f_m$) and the fractional distance (f), described above in FIG. 4A. As shown, $C_i$ and $C_{i+1}$ represent adjacent available bilerp counts, where $C_i$ is the "first" available bilerp count, and $C_{i+1}$ is the "second" available bilerp count. The x-axis again sets forth the desired bilerp count and the y-axis sets forth the modified bilerp count. The fractional distance (f) is shown on the x-axis, and the modified fractional distance ($f_m$) is shown on the y-axis. When the desired bilerp count ($C_D$) is between a first available bilerp count ($C_i$) and a non-zero value represented by a point 422, the modified bilerp count ($C_M$) is clamped to the first available bilerp count ($C_i$). The fractional distance (f) is between zero and a non-zero value, also represented by point 422, and the modified fractional distance ($f_m$) is clamped to zero, which results from equation (3) above. In this region, the texture value for a pixel is computed using only the bilerps in the first available bilerp count, as previously described herein. Again, the additional bilerps ($C_{i+1}-C_i$) are not used in computing the pixel texture value, thereby saving computational effort and increasing performance. The modified bilerp count may remain clamped to the first available bilerp count until the point at which the degradation in image quality begins to outweigh the savings in computational effort, which occurs at point 422.

When the desired bilerp count ($C_D$) is between point 422 and the second available bilerp count ($C_{i+1}$), represented by a point 424, the modified bilerp count ($C_M$) transitions from the first available bilerp count ($C_i$) to the second available bilerp count ($C_{i+1}$), as shown by a line 426. In this "transition band," the fractional distance (f) is between the non-zero value represented by point 422 and one, also represented by point 424, and the modified fractional distance ($f_m$) transitions from zero to one. Thus, at point 424, the desired bilerp count ($C_D$) and the modified bilerp count ($C_M$) are both equal to the second available bilerp count ($C_{i+1}$), and the fractional distance (f) and the modified fractional distance ($f_m$) are both equal to one. When the fractional distance (f) falls within the transition band, the pixel texture value is computed using both the bilerps in the first available bilerp count ($C_i$) and the additional bilerps ($C_{i+1}-C_i$), where the first weight ($x_1$) is applied to the texture value for each bilerp in the first available bilerp count, and the second weight ($x_2$) is applied to the texture value for each additional bilerp.

As shown in FIG. 4B, the line 426 within the transition band is a line of arbitrary slope. In alternative embodiments, the relationship between the fractional distance (f) and the modified fractional distance ($f_m$) within the transition band may be nonlinear or piece-wise linear. More generally, the relationship between the fractional distance (f) and the modified fractional distance ($f_m$) within the transition band may be defined and implemented in any technically feasible way that achieves the desired transition between points 422 and 424.

Figure 5A:
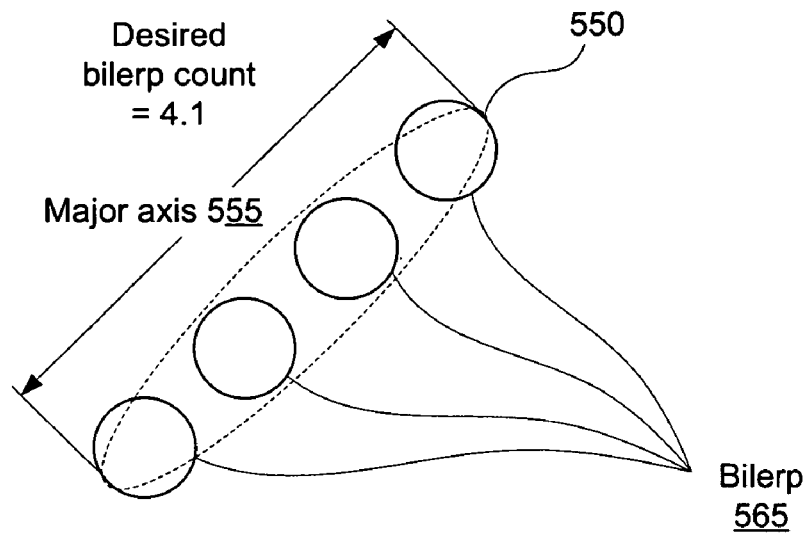
FIG. 5A is a conceptual diagram illustrating how bilerps may be spread when the modified bilerp count is clamped, according to one embodiment of the invention.

FIG. 5A is a conceptual diagram illustrating how bilerps may be spread when the modified bilerp count ($C_M$) is clamped, according to one embodiment of the invention. As previously described, when the modified bilerp count ($C_M$) is clamped, fewer bilerps are used to compute the texture value for the pixel. Again, only the bilerps in the first available bilerp count ($C_i$), and not the additional bilerps, are used in the pixel texture value computations. For example, consider a graphics system with a first available bilerp count of four and a second available bilerp count of six. Further consider an elliptical pixel footprint 550 with a major axis 555 length corresponding to a desired bilerp count of 4.1, as shown. In this example, if the modified bilerp count is clamped to the first available bilerp count of four, then only four bilerps 565, instead of six bilerps, are used to compute the texture value for the pixel. Effectively, the four bilerps 565 corresponding to the first available bilerp count are "spread" apart to approximate the elliptical pixel footprint 550. In one embodiment, the distance between the bilerps when they are spread is equal to the difference between the desired bilerp count ($C_D$) and the first available bilerp count ($C_i$) divided by the first available bilerp count minus one bilerp ($C_i - 1$), as set forth in the equation:

$$d = (C_D - C_i)/(C_i - 1). \quad (6)$$

In alternative embodiments, bilerp spreading may be accomplished in other technically feasible fashions. In this example, the fractional distance (f) is equal to 0.05. Referring back to FIG. 4B, since the modified bilerp count ($C_M$) is clamped to four bilerps, fractional distance of 0.05 is located to the left of point 422 along the x-axis, resulting in a modified fractional distance ($f_m$) equal to zero.

Figure 5B:
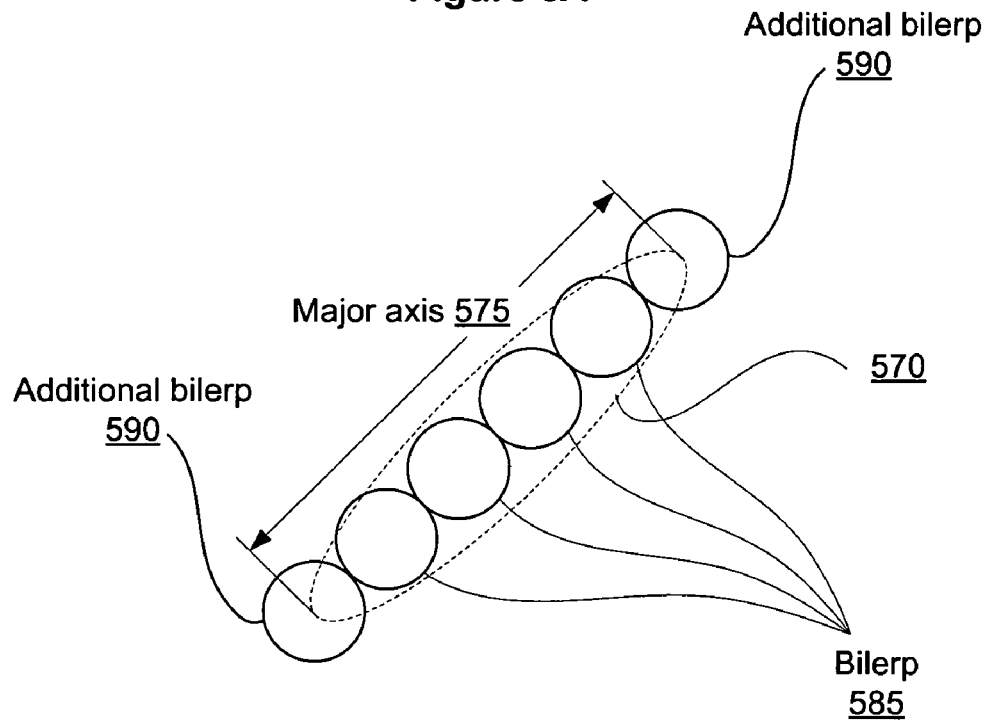
FIG. 5B is a conceptual diagram illustrating the modified bilerp count when the fractional distance is within the transition band, according to one embodiment of the invention.

FIG. 5B is a conceptual diagram illustrating the modified bilerp count ($C_M$) when the fractional distance (f) is within the transition band, according to one embodiment of the invention. As previously described herein, when the desired bilerp count ($C_D$) is a value that does not result in a clamped modified bilerp count ($C_M$), but has not reached the second available bilerp count ($C_{i+1}$), then the fractional distance (f) is within the transition band. Referring to the previous example of a graphics system with a first available bilerp count of four and a second available bilerp count of six, suppose the desired bilerp count ($C_D$) for an elliptical pixel footprint 570 having a major axis 575 is 5.5 bilerps. Here, the fractional distance (f) is equal to 0.75. Referring again to FIG. 4B, assuming that the fractional distance of 0.75 is located to the right of point 422, but to the left of point 424, the modified fractional distance ($f_m$) is a non-zero number between zero and one. Thus, the modified bilerp count ($C_M$) is no longer clamped to the first available bilerp level ($C_i$), but is instead transitioning to the second available bilerp level ($C_{i+1}$). In computing the texture value for the pixel, six bilerps are now used, as depicted in FIG. 5B. The texture value for each of four bilerps 585, corresponding to the first available bilerp count ($C_i$), is multiplied by a first weight determined by equation (4) above, and the texture value for each of two additional bilerps 590, corresponding to the difference between the second available bilerp count and the first available bilerp count ($C_{i+1}-C_i$), is multiplied by a second weight determined by equation (5) above. The weighted texture values are then summed together to determine the pixel texture value.

Figure 6A:
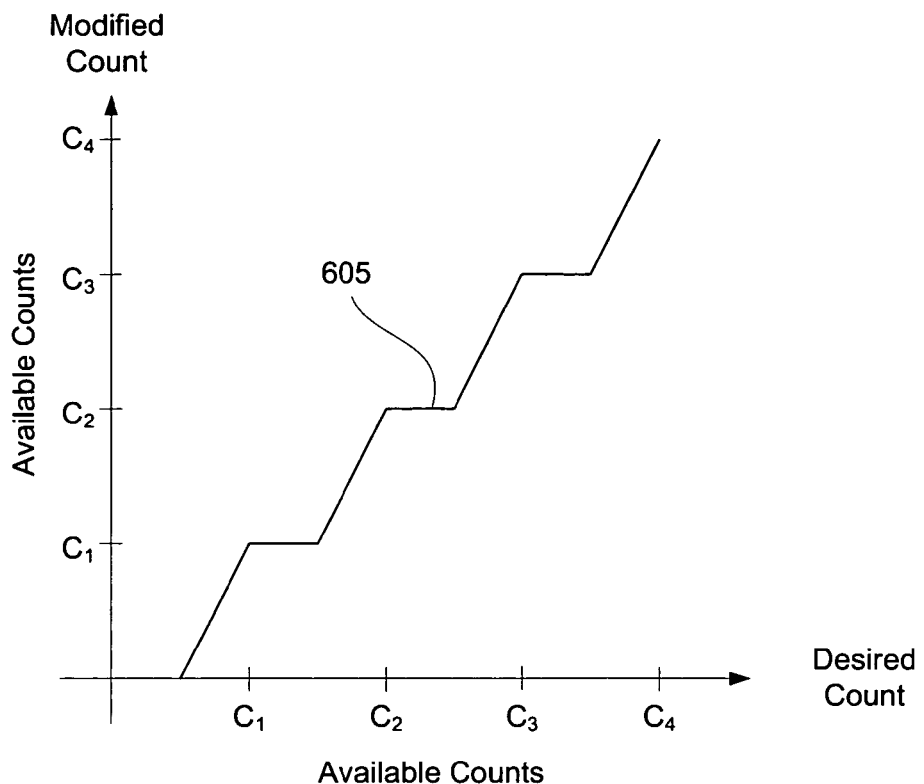
FIGS. 6A-6B illustrate two functions for computing the modified bilerp count that may be implemented when the texture value for a pixel is computed using two mipmaps, according to one embodiment of the present invention.
Figure 6B:
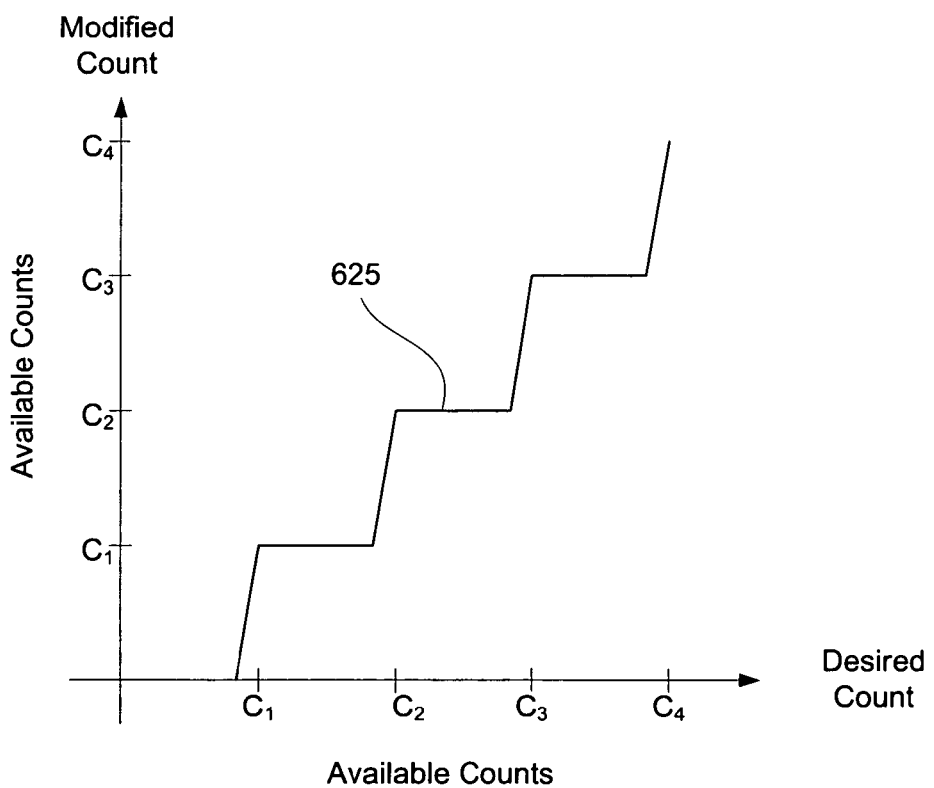

FIGS. 6A-6B illustrate two functions for computing the modified bilerp count that may be implemented when the texture value for a pixel is computed using two mipmaps, according to one embodiment of the present invention. As is well-known, trilinear anisotropic filtering computes a final texture value for a pixel from a weighted average of two intermediate texture values, one computed for each of two mipmap levels. Mipmap levels and the averaging weight may be determined in a variety of different ways. One approach is to calculate an LOD associated with the pixel. The integer portion of the calculated LOD value determines the mipmaps that are used in computing the intermediate texture values, and the fractional portion of the LOD value determines the weight assigned to each intermediate texture value when computing the final texture value. The two intermediate texture values may be computed using an optimized anisotropic filtering process, as previously described herein.

Since the final texture value is computed from a weighted average of the two intermediate texture values, the importance of one of the intermediate texture values may be substantially discounted relative to the other texture value, depending on the value of the fractional portion of the calculated LOD value. For example, when the fractional portion of the LOD value is close to either zero or one, one of the intermediate texture values may be sharply discounted in the final texture value computation. Consequently, the discounted intermediate texture value contributes little to the final texture value for the pixel. In such cases, additional performance gains may be realized by structuring the desired bilerp count-to-modified bilerp count function used in computing the heavily discounted intermediate texture value differently than the desired bilerp count-to-modified bilerp count function used in computing the other intermediate texture value.

For example, suppose the final texture value is computed from a weighted average of a first intermediate texture value and a second intermediate texture value, and the fractional portion of the calculated LOD is such that the second intermediate texture value is heavily discounted when computing the final texture value. FIG. 6A sets forth a first function 605 for determining the modified bilerp count from the desired bilerp count that may be used in computing the first intermediate texture value, and FIG. 6B sets forth a second function 625 for determining the modified bilerp count from the desired bilerp count that my be used in computing the second intermediate texture value. As a comparison of the first function 605 and the second function 625 shows, the modified bilerp count ($C_M$) is clamped more aggressively in the second function 625 than in the first function 605, meaning that the modified bilerp count ($C_M$) is clamped to the first available bilerp count ($C_i$) over a greater range of desired bilerp counts ($C_D$) relative to the second function 625. Consequently, the second function 625 results in more computational savings relative to the first function 605 because fewer bilerps are used to compute the second intermediate texture value than are used to compute the first intermediate texture value over a greater range of desired bilerp counts ($C_D$). However, because the second intermediate texture value is heavily discounted relative to the first intermediate texture value when computing the final texture value for the pixel, using the second function 625 to compute the second intermediate texture value and the first function 605 to compute the first intermediate texture value may not overly degrade image quality. Importantly, although more image degradation is associated with the second function 625, because the second intermediate texture value is heavily discounted in the final texture value computation, the negative impact on image quality resulting from using the second function 625 is also heavily discounted. In other words, the amount image quality degradation resulting from the second function 625 is mitigated because the first intermediate texture value contributes so heavily to the final texture value. Thus, by selecting appropriate desired bilerp count-to-modified bilerp count functions for the anisotropic texture filtering portions of a trilinear anisotropic filtering process, performance increases may be realized without overly degrading overall image quality.

Figure 7:
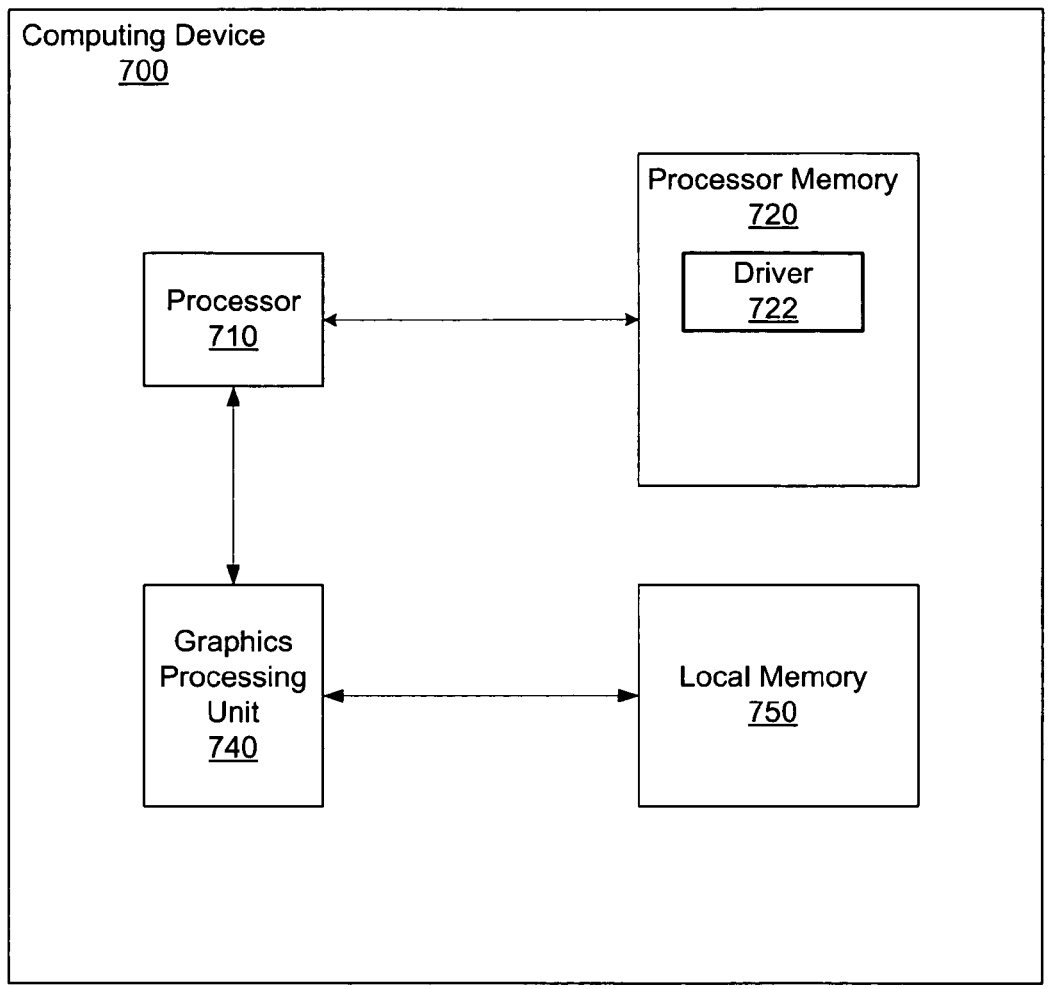
FIG. 7 illustrates a computing device in which one or more aspects of the present invention may be implemented.

FIG. 7 illustrates a computing device 700 in which one or more aspects of the present invention may be implemented. The computing device 700 includes, without limitation, a processor 710, processor memory 720, a graphics processing unit (GPU) 740 and local memory for the GPU 750. The computing device 700 may be a desktop computer, server, laptop computer, palm-sized computer, personal digital assistant, tablet computer, game console, cellular telephone, or any other type of similar device that processes image data. The processor 710 is coupled to the processor memory 720 used to store data and programs executed by the processor such as the driver 722, which may contain the anisotropic filter optimization functions. The processor also is coupled to the GPU 740. In one embodiment, the driver 722 configures the GPU 740 to perform anisotropic filtering operations based on modified bilerp counts computed using the desired bilerp count-to-modified bilerp count functions described herein. In alternative embodiments, the GPU 740 or some other special purpose processing unit may be specifically configured to perform the anisotropic filtering operations, where the GPU 740 or other special purpose processor stores the desired bilerp count-to-modified bilerp count functions. The GPU 740 is also coupled to local memory 750 that is used to store image data that has been or is to be filtered by the GPU 740.

While the foregoing is directed to embodiments of the present invention, other and further embodiments of the invention may be devised without departing from the basic scope thereof, and the scope thereof is determined by the claims that follow.

We claim:

1. A computer-implemented method for determining an optimized number of bilinear samples for computing a texture value for a pixel of a rendered object, the method comprising:

computing, using a processing unit, a first desired bilerp count related to a pixel footprint in a first mipmap, wherein the first desired bilerp count is between a first available bilerp count and a second available bilerp count, and a first fractional distance represents the distance between the first desired bilerp count and the first available bilerp count relative to the distance between the second available bilerp count and the first available bilerp count;

determining a first modified bilerp count based on the first desired bilerp count;

computing a first modified fractional distance based the first modified bilerp count, wherein the first modified fractional distance is equal to zero if the first fractional distance is between zero and a first non-zero value, and the first modified fractional distance is between zero and one if the first fractional distance is within a transition band defined between the first non-zero value and a second non-zero value;

computing the texture value for the pixel of the rendered object using the first modified fractional distance to produce image data; and storing the image data in a memory.

2. The method of claim 1, further comprising the step of computing a first weight and a second weight based on the first modified fractional distance.

3. The method of claim 2, wherein the first weight is computed based on the equation: $x_1=1/(C_i+(f_m)(C_{i+1}-C_i))$, where $x_1$ is the first weight, $C_i$ is the first available count, $C_{i+1}$ is the second available count, and $f_m$ is the first modified fractional distance.

4. The method of claim 3, wherein the second weight is computed based on the equation: $x_2=f_m*x_1$, where $x_2$ is the second weight.

5. The method of claim 4, wherein the first modified fractional distance is computed based on the equation: $f_m=(C_M-C_i)/(C_{i+1}-C_i)$, where $C_M$ is the modified bilerp count.

6. The method of claim 2, further comprising the steps of generating a first set of weighted texture values by multiplying the texture value for each bilerp in the first available bilerp count by the first weight, and generating a second set of weighted texture values by multiplying the texture value for each additional bilerp by the second weight, wherein the number of additional bilerps is equal to the difference between the second available bilerp count and the first available bilerp count.

7. The method of claim 6, further comprising the step of computing the texture value for the pixel by summing the first set of weighted texture values and the second set of weighted texture values.

8. The method of claim 1, wherein the second non-zero value is equal to one.

9. The method of claim 1, wherein the first fractional distance and the first modified fractional distance have a linear relationship within the transition band.

10. The method of claim 1, wherein the first fractional distance and the first modified fractional distance have a nonlinear relationship or piece-wise linear within the transition band.

11. The method of claim 1, further comprising the steps of:

computing a second desired bilerp count related to a pixel footprint in a second mipmap, wherein the second desired bilerp count is between a third available bilerp count and a fourth available bilerp count, and a second fractional distance represents the distance between the second desired bilerp count and the third available bilerp count relative to the distance between the fourth available bilerp count and the third available bilerp count;

determining a second modified bilerp count based on the second desired bilerp count; and computing a second modified fractional distance based on the second modified bilerp count, wherein the second modified fractional distance is equal to zero if the second fractional distance is between zero and a third non-zero value, and the second modified fractional distance is between zero and one if the second fractional distance is within a transition band defined between the third non-zero value and a fourth non-zero value.

12. The method of claim 11, further comprising the steps of:

computing a first weight and a second weight based on the first modified fractional distance;

computing a third weight and a fourth weight based on the second modified fractional distance;

generating a first set of weighted texture values by multiplying the texture value for each bilerp in the first available bilerp count by the first weight;

generating a second set of weighted texture values by multiplying the texture value for each additional bilerp in a first set of additional bilerps by the second weight, wherein the number of additional bilerps in the first set of additional bilerps is equal to the difference between the second available bilerp count and the first available bilerp count;

computing a first texture value for the pixel by summing the first set of weighted texture values and the second set of weighted texture values;

generating a third set of weighted texture values by multiplying the texture value for each bilerp in the third available bilerp count by the third weight;

generating a fourth set of weighted texture values by multiplying the texture value for each additional bilerp in a second set of additional bilerps by the fourth weight, wherein the number of additional bilerps in the second set of additional bilerps is equal to the difference between the fourth available bilerp count and the third available bilerp count;

computing a second texture value for the pixel by summing the third set of weighted texture values and the fourth set of weighted texture values; and computing a final texture value for the pixel by interpolating between the first texture value for the pixel and the second texture value for the pixel, wherein weights assigned to each of the first texture value for the pixel and the second texture value for the pixel are based on a fractional portion of a level of detail computation.

13. A computer-readable medium storing instructions for causing a computing device to determine an optimized number of bilinear samples for computing a texture value for a pixel by performing the steps of:

computing a desired bilerp count related to a pixel footprint in a mipmap, wherein the desired bilerp count is between a first available bilerp count and a second available bilerp count, and a fractional distance represents the distance between the desired bilerp count and the first available bilerp count relative to the distance between the second available bilerp count and the first available bilerp count;

determining a modified bilerp count based on the desired bilerp count;

computing a modified fractional distance based on the fractional distance, wherein the modified fractional distance is equal to zero if the fractional distance is between zero and a first non-zero value, and the modified fractional distance is between zero and one if the fractional distance is within a transition band defined between the first non-zero value and a second non-zero value;

computing a first weight and a second weight based on the modified fractional distance;

generating a first set of weighted texture values by multiplying the texture value for each bilerp in the first available bilerp count by the first weight;

generating a second set of weighted texture values by multiplying the texture value for each additional bilerp by the second weight, wherein the number of additional bilerps is equal to the difference between the second available bilerp count and the first available bilerp count; and computing the texture value for the pixel by summing the first set of weighted texture values and the second set of weighted texture values.

14. The computer-readable medium of claim 13, wherein the first weight is computed based on the equation: $x_1=1/(C_i+(f_m)(C_{i+1}-C_i))$, where $x_1$ is the first weight, $C_i$ is the first available count, $C_{i+1}$ is the second available count, and $f_m$ is the modified fractional distance.

15. The computer-readable medium of claim 14, wherein the second weight is computed based on the equation: $x_2=f_m*x_1$, where $x_2$ is the second weight.

16. The computer-readable medium of claim 15, wherein the modified fractional distance is computed based on the equation: $f_m=(C_M-C_i)/(C_{i+1}-C_i)$, where $C_M$ is the modified bilerp count.

17. A computing device configured to determine an optimized number of bilinear samples for computing a texture value for a pixel, the computing device comprising:
a memory; and
a processing unit configured to perform the steps of:
computing a desired bilerp count related to a pixel footprint in a mipmap, wherein the desired bilerp count is between a first available bilerp count and a second available bilerp count, determining a fractional distance representing the distance between the desired bilerp count and the first available bilerp count relative to the distance between the second available bilerp count and the first available bilerp count, determining a modified fractional distance based on the fractional distance, wherein the modified fractional distance is equal to zero if the fractional distance is between zero and a first non-zero value, and the modified fractional distance is between zero and one if the fractional distance is within a transition band defined between the first non-zero value and a second non-zero value, computing a first weight and a second weight based on the modified fractional distance, generating a first set of weighted texture values by multiplying the texture value for each bilerp in the first available bilerp count by the first weight, generating a second set of weighted texture values by multiplying the texture value for each additional bilerp by the second weight, wherein the number of additional bilerps is equal to the difference between the second available bilerp count and the first available bilerp count, and computing the texture value for the pixel by summing the first set of weighted texture values and the second set of weighted texture values.

18. The system of claim 17, wherein the first weight is computed based on the equation: $x_1=1/(C_i+(f_m)(C_{i+1}-C_i))$, where $x_1$ is the first weight, $C_i$ is the first available count, $C_{i+1}$ is the second available count, and $f_m$ is the modified fractional distance.

19. The system of claim 18, wherein the second weight is computed based on the equation: $x_2=f_m*x_1$, where $x_2$ is the second weight.

20. The system of claim 19, wherein the modified fractional distance is computed based on the equation: $f_m=(C_M-C_i)/(C_{i+1}-C_i)$, where $C_M$ is the modified bilerp count.

* * * * *

UNITED STATES PATENT AND TRADEMARK OFFICE
CERTIFICATE OF CORRECTION

PATENT NO.        : 7,558,400 B1                                    Page 1 of 1
APPLICATION NO.   : 11/299176
DATED             : July 7, 2009
INVENTOR(S)       : Toksvig et al.

It is certified that error appears in the above-identified patent and that said Letters Patent is hereby corrected as shown below:

On the cover page, item (57) Abstract, line 11, please replace "a first-non-zero" with -- a first non-zero --.

Signed and Sealed this

Twenty-seventh Day of October, 2009

David J. Kappos
*Director of the United States Patent and Trademark Office*